(12) United States Patent
Anderson et al.

(10) Patent No.: US 8,897,954 B2
(45) Date of Patent: Nov. 25, 2014

(54) METHOD FOR CALIBRATING POSITION SENSOR ON ELECTRIC MOTOR

(75) Inventors: Eric R. Anderson, Galena, IL (US); Zimin Wu Vilar, Dubuque, IA (US)

(73) Assignee: Deere & Company, Moline, IL (US)

( * ) Notice: Subject to any disclaimer, the term of this patent is extended or adjusted under 35 U.S.C. 154(b) by 735 days.

(21) Appl. No.: 13/101,333

(22) Filed: May 5, 2011

(65) Prior Publication Data
US 2012/0279791 A1 Nov. 8, 2012

(51) Int. Cl.
*B60K 1/00* (2006.01)
*G06F 19/00* (2011.01)
*E02F 3/04* (2006.01)
*E02F 9/20* (2006.01)

(52) U.S. Cl.
CPC .............. *E02F 9/2095* (2013.01); *E02F 9/2079* (2013.01); *B60K 1/00* (2013.01); *B60Y 2200/415* (2013.01)
USPC ........... 701/33.1; 701/22; 701/29.1; 318/652; 318/638; 318/832; 318/437; 318/491; 318/493; 318/494

(58) Field of Classification Search
CPC ............... H02P 9/00; H02P 7/00; H02P 5/52; G01R 31/00; G01R 33/00; G04F 10/00
USPC .......... 701/29.1, 22, 33.1; 318/652, 638, 832, 318/437, 489, 633, 400.06, 550, 490, 491, 318/493, 494
See application file for complete search history.

(56) References Cited

U.S. PATENT DOCUMENTS

| | | | | |
|---|---|---|---|---|
| 4,684,911 A * | 8/1987 | Streeter | ........................ | 335/288 |
| 5,063,454 A * | 11/1991 | Hashimoto | ................ | 360/78.04 |
| 5,469,215 A * | 11/1995 | Nashiki | .................... | 318/432 |
| 5,796,228 A * | 8/1998 | Kojima et al. | ................ | 318/605 |
| 6,281,656 B1 * | 8/2001 | Masaki et al. | ................ | 318/700 |
| 6,456,030 B1 * | 9/2002 | Masaki et al. | ................ | 318/700 |
| 6,567,282 B1 * | 5/2003 | Kikuchi et al. | .................. | 363/37 |
| 6,597,141 B1 * | 7/2003 | Wilson-Jones et al. | ........ | 318/560 |
| 6,826,499 B2 * | 11/2004 | Colosky et al. | ................. | 702/85 |
| 6,834,244 B2 * | 12/2004 | Kim | ................................ | 702/72 |
| 7,262,536 B2 * | 8/2007 | Rahman et al. | .......... | 310/156.35 |
| 7,545,111 B2 * | 6/2009 | Fu et al. | .................. | 318/400.23 |
| 7,659,688 B2 * | 2/2010 | Schulz et al. | ................. | 318/807 |
| 7,679,308 B2 * | 3/2010 | Tomigashi | .................... | 318/807 |
| 8,476,852 B2 * | 7/2013 | Hawker et al. | ........... | 318/400.14 |
| 2003/0076060 A1 * | 4/2003 | Colosky et al. | ............... | 318/254 |
| 2003/0184246 A1 * | 10/2003 | Sardar et al. | .................. | 318/369 |
| 2008/0092893 A1 * | 4/2008 | Boyle et al. | .............. | 128/204.21 |
| 2010/0253258 A1 * | 10/2010 | Fabis et al. | ............... | 318/400.13 |
| 2011/0109279 A1 * | 5/2011 | Li et al. | .......................... | 322/99 |
| 2011/0130996 A1 * | 6/2011 | Blind et al. | ..................... | 702/94 |
| 2011/0163704 A1 * | 7/2011 | Wang et al. | .............. | 318/400.21 |
| 2012/0161725 A1 * | 6/2012 | Hartman et al. | ................ | 322/99 |
| 2012/0206072 A1 * | 8/2012 | Leong et al. | ............ | 318/400.06 |
| 2012/0216630 A1 * | 8/2012 | Bosga et al. | ............... | 73/862.29 |
| 2012/0217912 A1 * | 8/2012 | Wu et al. | ................. | 318/400.04 |

FOREIGN PATENT DOCUMENTS

JP 2011050153 A * 3/2011

* cited by examiner

*Primary Examiner* — Thomas G Black
*Assistant Examiner* — Sara Nelson
(74) *Attorney, Agent, or Firm* — Faegre Baker Daniels LLP

(57) ABSTRACT

A method is provided of calibrating a position sensor of an electric motor of a vehicle.

22 Claims, 4 Drawing Sheets

METHOD FOR CALIBRATING POSITION SENSOR ON ELECTRIC MOTOR

FIELD

The present disclosure relates to a vehicle having an electric motor. More particularly, the present invention relates to calibrating the position sensor on a permanent magnet electric motor of a vehicle.

BACKGROUND

During the operation of some electric motors, it is necessary or helpful to know the relative position of the motor stator and the motor rotor to determine optimal performance and efficiency. To determine the relative position of the stator and rotor, one or more sensors are provided to detect the position of the rotor. Due to manufacturing tolerances, environmental influences, and other factors including field serviceability of the sensors, the position of the rotor as detected by the sensor(s) may not be perfectly accurate resulting in a position indication error.

SUMMARY

The present disclosure provides a method for calibrating a position sensor of a motor.

According to one aspect of the present disclosure, a vehicle is provided that includes a chassis; at least one ground engaging mechanism configured to propel the chassis over the ground; a tool supported by the chassis to move material; and at least one electric motor supported by the chassis and configured to convert electrical power into mechanical power. The motor has a rotor and a stator. The rotor has a magnetic field and the stator has a magnetic field. The vehicle includes a sensor configured to provide an indication of the relative position of the rotor to the stator. The vehicle further includes a controller controlling at least one of the magnetic field of the rotor and the magnetic field of the stator to cause an angular difference between the magnetic fields of the rotor and the stator. The controller controls the angular difference based on a calibration test of the sensor.

According to another aspect of the present disclosure, a method of calibrating a position sensor on a vehicle is provided including the steps of providing a vehicle including a chassis; at least one ground engaging mechanism configured to propel the chassis over the ground; a tool supported by the chassis to move material; and at least one electric motor supported by the chassis and configured to convert electrical power into mechanical power. The motor has a rotor and a stator. The rotor has a magnetic field, and the stator has a magnetic field. The vehicle further includes a sensor configured to provide an indication of the relative position of the rotor to the stator. The method further includes determining an offset of the indicated relative position of the rotor to the stator, and controlling an angular difference between the magnetic field of the rotor and the magnetic field of the stator based on the determined offset.

BRIEF DESCRIPTION OF THE DRAWINGS

The above-mentioned and other features and advantages of this disclosure, and the manner of attaining them, will become more apparent and the disclosure itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

The embodiments disclosed below are not intended to be exhaustive or limit the invention to the precise forms disclosed in the following detailed description. Rather, the embodiments are chosen and described so that others skilled in the art may utilize their teachings.

Figure 1:
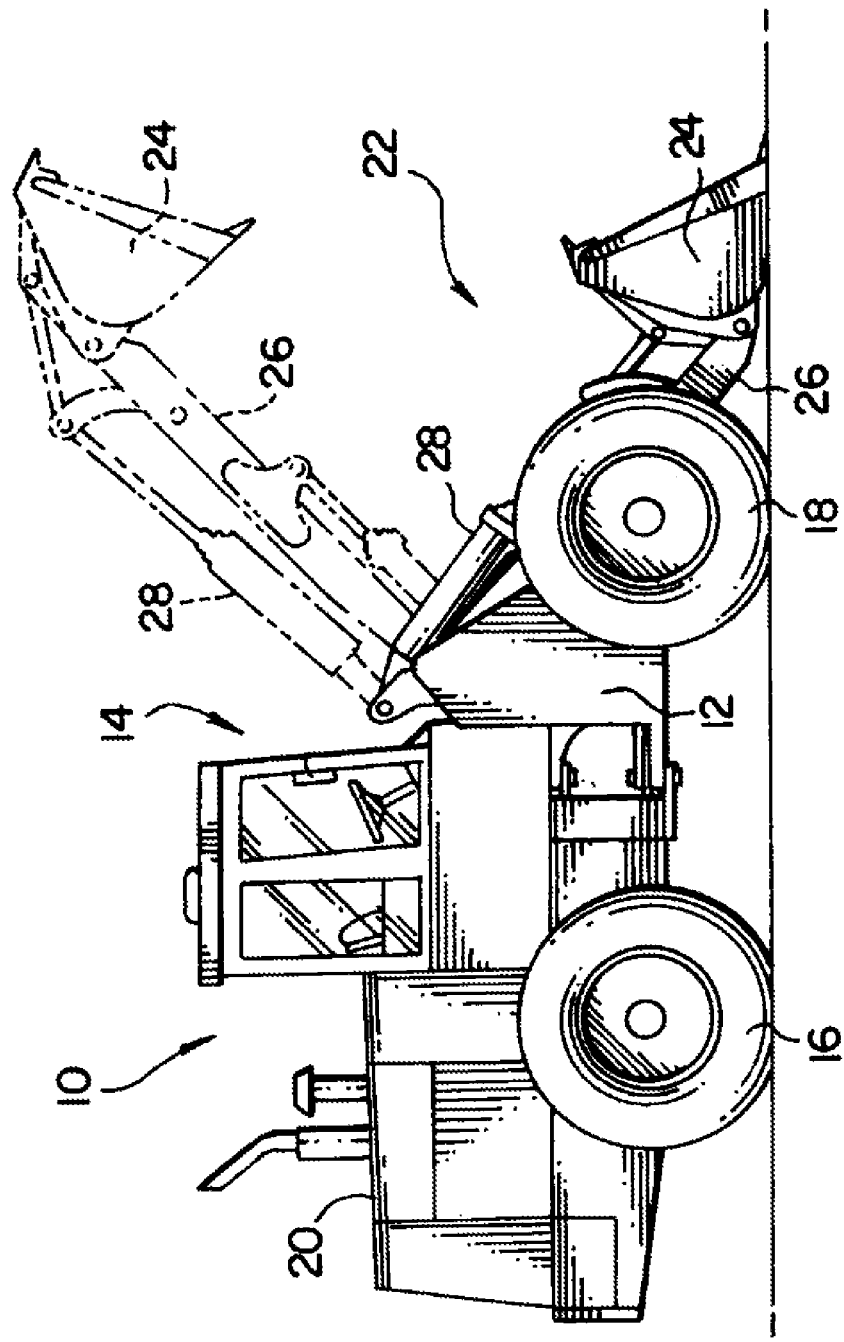
FIG. 1 is an elevational view of a loader.

Loader 10 is shown in FIG. 1 for scooping and dumping material. Loader 10 includes articulated chassis 12, operator cab 14 supported by chassis 12, pair of rear wheels 16, also described as ground engaging mechanisms, to propel chassis 12 and the remainder of loader 10, pair of front wheels 18, which may also be described as ground engaging mechanisms and may also propel loader 10, engine 20 to power operation of loader 10, and boom assembly 22. Boom assembly 22 includes bucket 24, boom linkages 26, and lift cylinders 28.

Although a loader is described in detail, the features described herein may be provided on other vehicles such as bull dozers, motor graders, and other construction vehicles having various construction tools and ground engaging mechanisms, such as wheels and tracks. The vehicle may also be agricultural or forestry vehicles, such as a tractor, combine, feller bunchers, harvesters, or other agriculture or forestry vehicles. Bucket 24 is described as a construction tool that scoops and dumps materials, such as dirt, sand, gravel, salt, snow, and other materials. Other tools, such as blades, pallet forks, bail lifts, augers, plows, trailers, planters, corn heads, cutting platforms, and other tools may also be provided to move materials.

Figure 2:
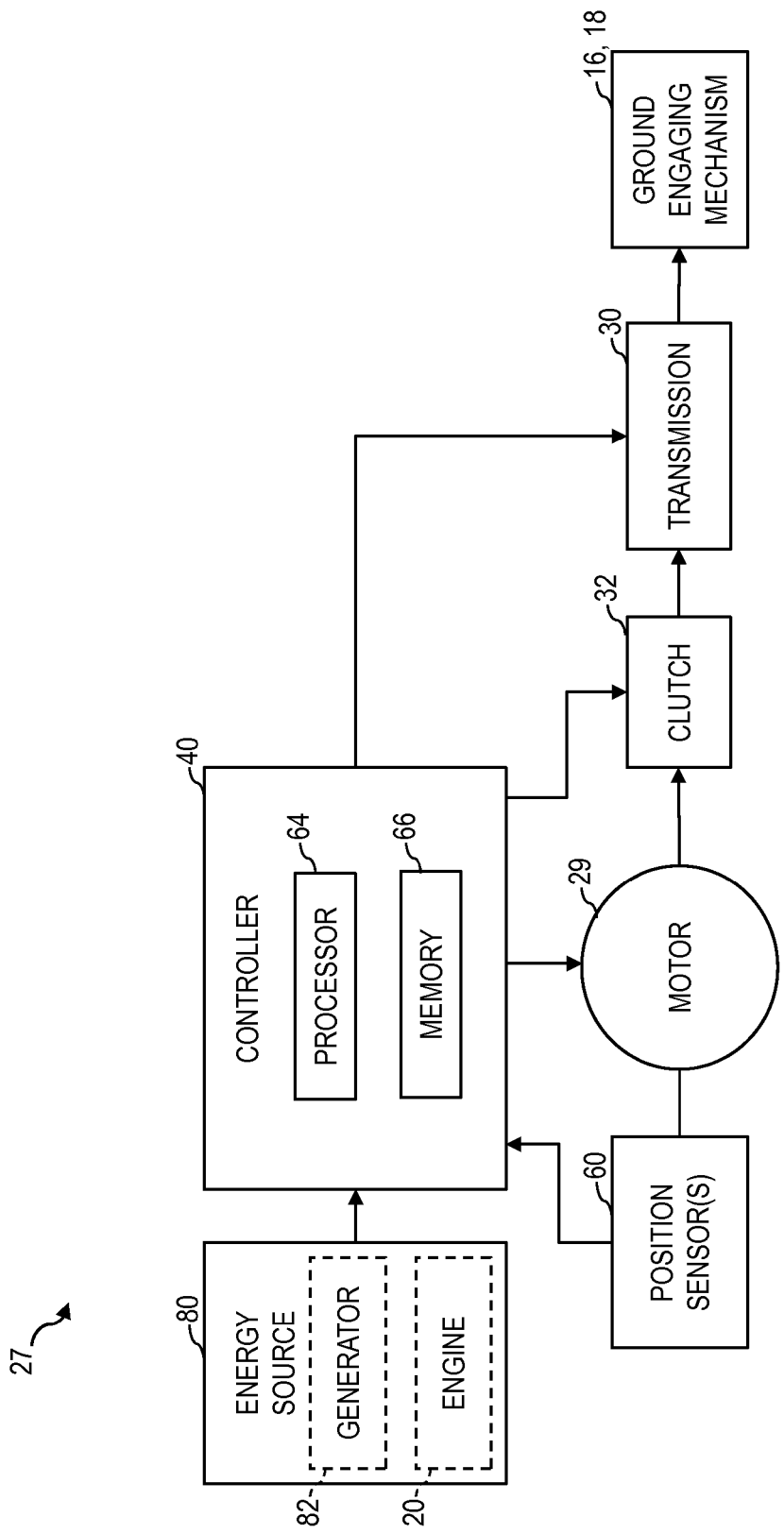
FIG. 2 is a schematic view of the drive train of the loader of FIG. 1 showing the drive train including a transmission, a motor, and a clutch.
Figure 3:
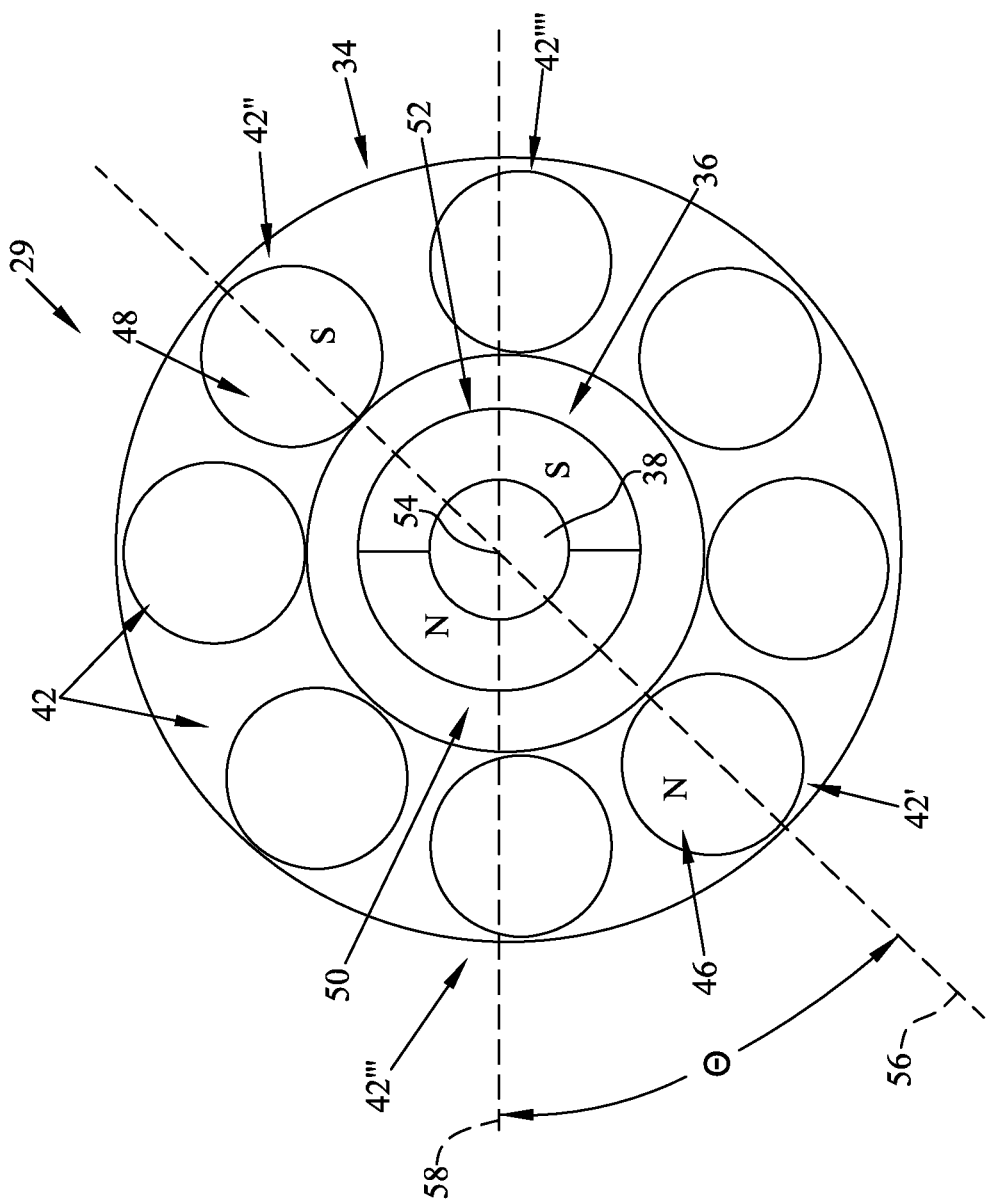
FIG. 3 is a schematic view of the motor of FIG. 2 including a stator with a plurality of winding coils and a rotor having a permanent magnet.

As illustrated in FIG. 2, loader 10 includes a drive train 27 to power rotational movement of wheels 16, 18. According to the preferred embodiment of the present disclosure, drivetrain 27 includes at least one electric motor 29, a transmission 30, and a clutch 32 to disengage electric motor 29 from transmission 30. In one embodiment, one or more clutches 32 are included within transmission 30. As illustrated in FIG. 3, electric motor 29 include a stator 34 supported by chassis 12 and a rotor 36 with an output shaft 38 that rotates relative to stator 34 to power transmission 30. Typically, transmission 30 changes the input speed and torque provided by motor 29 to an output speed and torque preferred for wheels 16, 18. Loader 10 further includes one or more controllers 40 that regulate the operation of motor 29 and transmission 30 to provide the desired speed and torque for wheels 16, 18. Controller 40 illustratively includes a processor 64 and memory 66 containing software accessible by processor 64. Controller 40 regulates the desired speed and torque based on operator inputs from operator cab 14, software, and other parameters.

Although motor 29 is illustrated and described as part of drive train 27, the devices and methods described herein can be used in other motor driven apparatuses of vehicle 10, such as hydraulic pumps, for example. Additional electric motors may also be provided to drive the other wheels 16, 18 and other devices of vehicle 10.

Controller 40 illustratively controls the delivery of power from an energy source 80 to motor 29. In the illustrated embodiment, engine 20 of vehicle 10 powers a generator 82 that provides the electrical power for motor 29. Energy source 80 may also or alternatively include batteries, capacitors, and/or other electrical power sources for driving motor 29. Motor 29 converts this electrical power into mechanical power.

As illustrated in FIG. 3, schematic stator 34 includes a plurality of coils 42 that generate a magnetic field by passing current through the respective coils 42. Depending on the direction of the current flow (positive or negative), the coil will produce a north magnetic field or a south magnetic field. The strength of the current flowing through the respective coil 42 will determine the strength of the magnetic field. As illustrated in FIG. 3, coil 42' is generating a north magnetic pole 46 and opposite coil 42" is generating a south magnetic pole 48. The number of coils 42 of stator 34 may be greater or less than those shown.

For illustrative purposes, schematic rotor 36 includes a single magnet having a north magnetic pole 50 and one south magnetic pole 52. The number of magnets of rotor 36 may be greater than those shown.

Controller 40 controls when each of coils 42 generates a north pole 46 and when each of coils 42 generates a south pole 48. For example, as shown in FIG. 3, controller 40 causes coil 42' to generate north pole 46 and coil 42" to generate south pole 48 at a particular time based on the location of rotor 36. Because like poles repel each other, north pole 46 of coil 42' repels north pole 50 of rotor 36. Similarly, south pole 48 of coil 42" repels south pole 52 of rotor 36. The repelling of north poles 46, 50 and south poles 48, 52 about axis of rotation 54 creates torque on rotor 36, causing it to rotate. As described herein, controller 40 is configured to maximize motor torque by causing the generation of poles 46, 48 when the angle between the magnetic axis 56 of stator 34 and the magnetic axis 58 of rotor 36 is at an optimum angle (i.e., at gamma angle λ).

To keep rotor 36 rotating, controller 40 switches the current flowing through the respective coils 42 of stator 34 to continuously apply torque to rotor 36. For example, to rotate rotor 36 in a clockwise direction, controller 40 will pass current through coil 42''' to create north pole 46 and through coil 42'''' to create south pole 48 as rotor 36 rotates. Controller 40 will continue to move north and south poles 46, 48 in a clockwise direction to keep rotor 36 rotating in the clockwise direction.

Controller 40 can control the output (speed and torque) of rotor 36 by adjusting the magnitude and flow of current through coils 42. For example, to increase the rotational speed of rotor 36, controller 40 may increase the speed at which north and south poles 46, 48 switch from one coil 42 to the next coil 42.

In addition to the rotational speed of the north and south poles 46, 48, the relative position of magnetic axis 56 of poles 46, 48 and magnetic axis 58 of poles 50, 52 impacts the output or performance of motor 29. Motor 29 is configured to produce a maximum torque by improving or optimizing the angle between axis 56 of stator 34 and axis 58 of rotor 36. The optimum angle for maximum torque is referred to as the gamma angle (γ). In the illustrated embodiment, the gamma angle is predetermined based on the design of motor 29 and is stored in memory 66 of controller 40.

As illustrated in FIG. 2, one or more sensors 60 are provided to detect the position of rotor 36, which will indicate the position of axis 58 of poles 50, 52 of rotor 36. By knowing the position of axis 58, controller 40 can energize respective coils 42 at the appropriate time to achieve the gamma angle between axis 58 and axis 56. In particular, based on the predetermined gamma and the determined position of axis 58 indicated by sensors 60, controller 40 can instruct each coil 42 to energize at the appropriate time to achieve the gamma angle and to thus maximize the torque performance of motor 29. Sensors 60 may be optical, magnetic, or other sensors capable of detecting the relative position of a rotating object. Additional details such sensors and the operation of a motor are provided in U.S. Pat. No. 6,826,499, the entire disclosure of which is expressly incorporated by reference herein.

Because of manufacturing tolerances, inherent error in sensors 60, and other factors, the position of axis 58 as determined by controller 40 may not be accurate. As such, controller 40 may energize coils 42 at what it calculates as the appropriate time for achieving the gamma angle, but in reality it may not be the appropriate time due to error and offsets introduced by sensors 60 or otherwise. For example, the mounting of sensors 60 may be offset one degree because of manufacturing tolerances or mounting error. As such, controller 40 may determine that axis 58 is at a 45° angle relative to axis 56, for example, rather than 44°, its actual position. As a result, controller 40 energizes the respective coil 42 sooner than optimal, resulting in underperformance of motor 29.

According to the present disclosure, controller 40 calculates the difference, referred to as the offset, between the actual position of rotor 36 (or axis 58) and the position of rotor 36 indicated by sensor 60. Controller 40 uses the calculated offset and the predetermined gamma to determine when to energize (and de-energize) the particular coils 42. For example, if the predetermined gamma is 45° and sensor 60 is providing a forward offset of one degree (i.e. sensor 60 indicates that rotor 36 is one degree further in its rotation than it actually is), controller 40 will compensate when it energizes coils 42 by one degree. For example, with rotor 36 rotating clockwise, assume that it is optimal to energize coil 42' (with its axis 56 at 225°) when axis 58 of rotor 36 is at 180° based on the predetermined gamma angle of 45°. Without offset correction, controller 40 energizes coil 42' one degree too soon at an angle of 44° between axes 56 and 58 (i.e., when axis 58 is at 181°). However, with offset correction, controller 40 waits an additional degree of rotation of rotor 36 and energizes coil 42' when the angle between axes 56 and 58 is the gamma angle of 45°.

Figure 4:
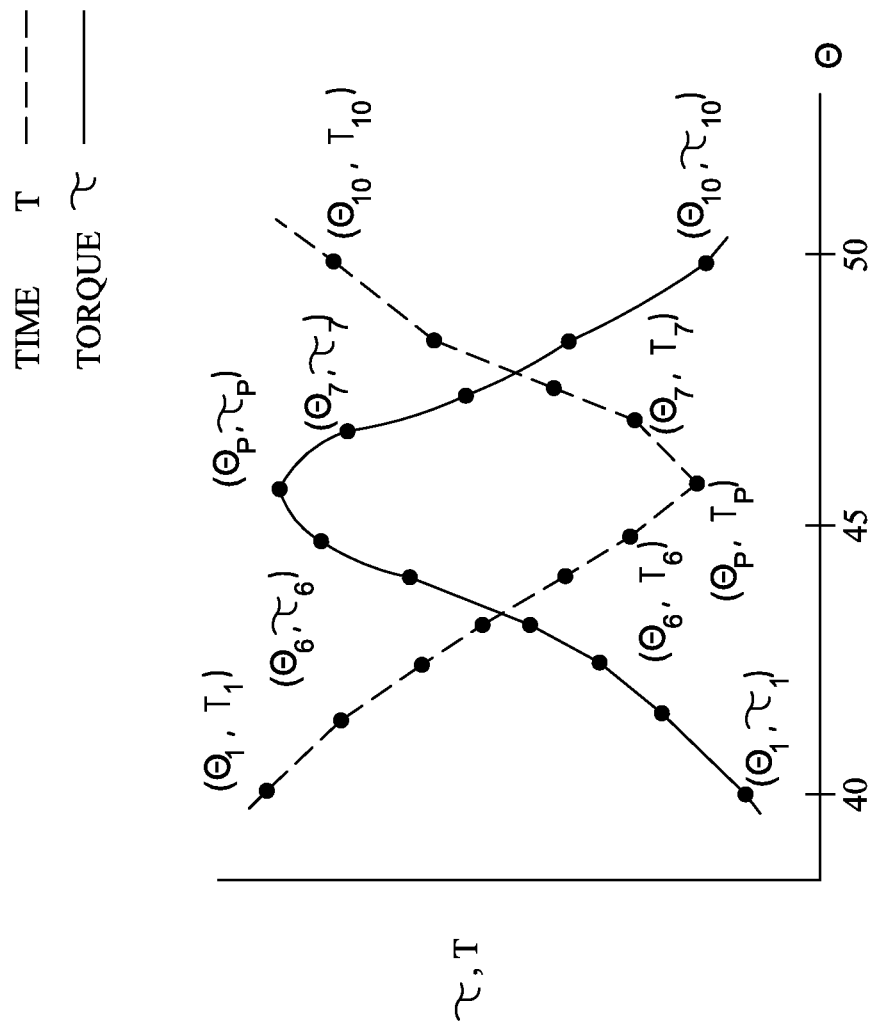
FIG. 4 is a graph showing the relationship of the torque produced by the motor as a function of the angular difference ($\theta$) between the magnetic field of the rotor relative to the magnetic field of the stator.

According to the preferred embodiment of the present disclosure, controller 40 runs a calibration test to determine the offset. As shown in FIG. 4, the torque produced by motor 29 during a calibration test is dependent upon the angle θ between axis 58 of rotor 36 and the magnetic axis of the corresponding stator coil 42 (e.g. axis 56 of coils 42', 42"). To run the calibration test, controller 40 disengages clutch 32 so that motor 29 no longer drives transmission 30. With clutch 32 disengaged, controller 40 drives motor 29 to a first speed (ex. 4000 rpm). Controller 40 then drives motor 29 to a second speed (ex. 7000 rpm) at a first offset, for example, at an offset of 5° below the gamma angle of 45°. As such, controller 40 energizes the respective coils 42 at an angle θ of 40° between axis 58 and axis 56. Controller 40 measures and records the amount of time it requires to reach the second speed from the first speed. Controller 40 then drives motor 29 back to the first speed (e.x. 4000 rpm) and again drives motor 29 to the second speed (ex. 7000 rpm), but at a second offset that is reduced compared to the first offset (ex. one degree closer to gamma than the first offset), and again records the time it requires to reach the second speed. For example, controller 40 energizes the respective coils 42 at an angle θ of 41° between axis 58 and axis 56. In the illustrated embodiment, controller 40 provides the same current magnitude and the same switching speed of north and south poles 46, 48 around coils 42 for each tested offset to maintain test integrity. Controller 40 stores the recorded times and other test variables and parameters in memory 66 (FIG. 2).

The incremental testing continues until controller 40 detects that the time to reach the second speed from the first speed begins to increase. The increase in time indicates that the peak torque, which indicates the optimum offset, has been passed. For example, in FIG. 4, the times ($T_6$ and $T_7$) to reach torque $\tau_6$ at angle $\theta_6$ and torque $\tau_7$ at angle $\theta_7$ are less that than for the other test angles (angles $\theta_1$-$\theta_5$ and $\theta_8$-$\theta_{10}$). Accordingly, motor 29 produces greater torque at test angles $\theta_6$ and $\theta_7$ as compared to these other test angles. Based on this, controller 40 knows the optimal angle is between $\theta_5$ and $\theta_7$ because the currently measured maximum torque ($\tau_6$) occurred between these angles.

In one embodiment, controller 40 derives the torque output from the measured time period between the first speed and the second speed based on the following equation:

$$\tau = I_{combined} \frac{\Delta w}{\Delta t} \quad (1)$$

wherein τ is the torque output of motor 29, $I_{combined}$ is the total moment of inertia of motor 29 and of components rotationally coupled to motor 29 (e.g. output shaft, etc.), Δt is a measurement period, and Δω is the change in angular velocity of motor 29 over the measurement period Δt. In the example above, Δω is the difference between the first speed and the second speed (ex. 3000 rpm), and Δt is the time it takes for motor 29 to accelerate from the first speed (ex. 4000 rpm) to the second speed (ex. 7000 rpm). As illustrated with Equation (1), a smaller Δt results in a greater torque output at a fixed Δω. In one embodiment, position sensor 60 is used to measure the speed or angular velocity of motor 29, although another speed sensor may be provided for determining motor speed. The moments of inertia of motor 29 and components coupled to motor 29 are known physical quantities based on the mass and dimensions of the corresponding component, and these values are stored in memory 66 of controller 40.

To further refine the measured, optimum angle θ, controller 40 re-runs the test at smaller increments of offset between angles $\theta_5$ and $\theta_7$. Re-running the test at still smaller increments continues until a peak torque ($\tau_p$) is determined. The peak torque $\tau_p$ may be determined based on a predetermined difference between three or more measured torques or some other method indicating that a peak has been reached within a desired range.

Once the peak torque is determined, controller 40 then knows that the optimal offset is based on the angle ($\theta_p$) which resulted in the peak torque ($\tau_p$). Comparing the angle $\theta_p$ with the predetermined gamma angle λ results in the sensor offset. For example, if an angle $\theta_p$ of 45.9° resulted in the peak torque $\tau_p$ and gamma λ is 45°, the offset would be 0.9°.

Controller 40 uses the calculated offset to calibrate sensor 60. As a result of the example test above, controller 40 energizes coil 42' when sensor 60 detects axis 58 of rotor 36 at 179.1° (i.e. the known location of axis 56 of coil 42') (225°)–predetermined gamma (45)°–the offset (0.9°)).

Controller 40 may run the calibration test to determine the offset at any time. For example, controller 40 may run the calibration test at startup of vehicle 10. Controller 40 may run the calibration test at predetermined intervals (ex. once/day, once/week, etc.). The operator of vehicle 10 may also request a calibration test by providing instructions to controller 40 to run the test.

Controller 40 may also run the calibration test when the circumstances of vehicle 10 change. For example, if sensor 60 is replaced with a replacement sensor 60, controller 40 can run the calibration test to determine the new offset for the new, replacement sensor 60. Such a test can be run in the field (i.e. away from a repair shop) so vehicle 10 does not need to be returned to a repair shop to determine the offset of the new, replacement sensor 60.

In one embodiment, drive train 27 (FIG. 2) does not include a transmission 30 and a clutch 32, and motor 29 is directly coupled to a final drive and/or ground engaging mechanism(s). In this embodiment, prior to the calibration test, the driven ground engaging mechanism is removed from contact with the ground. As such, motor 29 may be accelerated while vehicle 10 remains stationary. Further, the approximate torque output of motor 29 is determined based on Equation (1) above while considering the known moments of inertia all components, including the final drive and/or ground engaging mechanism, rotationally coupled to motor 29.

While this invention has been described as having preferred designs, the present invention can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this invention pertains and which fall within the limits of the appended claims.

The invention claimed is:

1. A vehicle including:
   a chassis;
   at least one ground engaging mechanism configured to propel the chassis over the ground;
   a tool supported by the chassis to move material;
   at least one electric motor supported by the chassis and configured to convert electrical power into mechanical power, the motor having a rotor and a stator, the rotor having a magnetic field and the stator having a magnetic field;
   a sensor configured to provide an indication of the relative position of the rotor to the stator; and
   a controller controlling at least one of the magnetic field of the rotor and the magnetic field of the stator to cause an angular difference between the magnetic fields of the rotor and the stator, the controller controlling the angular difference based on a calibration test of the sensor wherein the controller calculates an error in the indicated relative position of the rotor in response to a torque applied to the rotor, wherein the controller is operative to operate the motor at a first speed and to increase the speed of the motor from the first speed to a second speed during the calibration test.

2. The vehicle of claim 1, further comprising a clutch coupled between the electric motor and a vehicle component receiving mechanical power from the electric motor, wherein the controller is operative to disengage the clutch during the calibration test of the sensor.

3. The vehicle of claim 1, wherein the motor provides mechanical power to the ground engaging mechanism.

4. The vehicle of claim 1, wherein the controller includes memory recording the time for the motor to reach the second speed from the first speed, the controller calculates the error in the indicated relative position of the rotor to the stator based on the recorded time, and the controller controls the angular difference based on the calculated error.

5. The vehicle of claim 1, wherein the controller is operative to run the calibration test by
running a first time test in which the controller increases the speed of the motor from the first speed to the second speed at a first angular difference and records a first time to reach the second speed from the first speed,
running a second time test in which the controller increases the speed of the motor from the first speed to the second speed at a second angular difference that is different from the first angular difference and records a second time to reach the second speed from the first speed, the first and second angular differences being based on the indicated relative position of the rotor and the stator provided with the sensor,
using the recorded first and second times to determine a position offset of the rotor and the stator, and
controlling the angular difference based on the position offset of the rotor and stator.

6. The vehicle of claim 1, wherein the controller uses a measurement indicative of the torque output of the motor to determine a position offset of the indicated relative position of the rotor to the stator, the position offset being used to control the angular difference between the magnetic fields of the rotor and the stator.

7. The vehicle of claim 1, wherein the controller calculates the error in the indicated relative position of the rotor to the stator based on an acceleration rate of the motor.

8. The vehicle of claim 7, wherein the controller has memory storing data representative of a predetermined angular difference, and the controller controls the angular difference based on the calculated error and the predetermined angular difference.

9. A method of calibrating a position sensor on a vehicle, the vehicle including a chassis, a ground engaging mechanism to propel the chassis, a tool supported by the chassis to move material, and at least one electric motor having a rotor and a stator for converting electrical power to mechanical power, the method including:
receiving, by a controller of the vehicle, an indication of the relative position of the rotor to the stator provided by a sensor, the rotor having a magnetic field and the stator having a magnetic field;
determining, by the controller, an offset of the indicated relative position of the rotor to the stator in response to a torque applied to the rotor, the determining the offset including operating the motor at a first speed and increasing the speed of the motor from the first speed to a second speed; and
controlling, by the controller, an angular difference between the magnetic field of the rotor and the magnetic field of the stator based on the determined offset.

10. The method of claim 9, wherein the motor provides mechanical power to the ground engaging mechanism.

11. The method of claim 9, wherein the vehicle includes a clutch coupled between the electric motor and a vehicle component receiving mechanical power from the electric motor, the method further comprising disengaging the clutch prior to the determining the offset.

12. The method of claim 11, wherein the determining the offset includes operating the motor at the first speed while the clutch is disengaged and increasing the speed of the motor from the first speed to the second speed while the clutch is disengaged.

13. The method of claim 9, wherein the first speed is greater than zero RPM.

14. The method of claim 9, wherein the determining the offset includes recording the time from when the motor operates at the first speed to when the motor reaches the second speed, the offset being based on the recorded time.

15. The method of claim 9, wherein the determining the offset includes
running a first time test in which the speed of the motor is increased from the first speed to the second speed at a first angular difference,
recording a first time to reach the second speed from the first speed at the first angular difference,
running a second time test in which the speed of the motor is increased from the first speed to the second speed at a second angular difference that is different than the first angular difference,
recording a second time to reach the second speed from the first speed at the second angular difference, and
using the recorded first and second times to determine the offset.

16. The method of claim 9, wherein the determining includes using a measurement indicative of the torque output of the motor to determine the offset.

17. The method of claim 9, wherein the controller includes memory storing data representative of a predetermined angular difference and the controlling includes controlling the angular difference based on the offset and the predetermined angular difference.

18. The method of claim 9, further comprising replacing the sensor and performing the determining after replacing the sensor.

19. The method of claim 18, wherein the vehicle is positioned away from a maintenance facility during the-determining the offset.

20. A vehicle including:
a chassis;
at least one ground engaging mechanism configured to propel the chassis over the ground;
a tool supported by the chassis to move material;
at least one electric motor supported by the chassis and configured to convert electrical power into mechanical power, the motor having a rotor and a stator, the rotor having a magnetic field and the stator having a magnetic field;
a sensor configured to provide an indication of the relative position of the rotor to the stator; and
a controller controlling at least one of the magnetic field of the rotor and the magnetic field of the stator to cause an angular difference between the magnetic fields of the rotor and the stator, the controller controlling the angular difference based on a calibration test of the sensor, wherein the controller calculates the error in the indicated relative position of the rotor to the stator based on an acceleration rate of the motor.

21. The vehicle of claim 20, wherein the controller records a time for the motor to accelerate to a second speed from a first speed, the controller calculates the error in the indicated relative position of the rotor to the stator based on the recorded time, and the controller controls the angular difference based on the calculated error.

22. The vehicle of claim 20, wherein the controller includes memory storing data representative of a predetermined angular difference, and the controller controls the angular difference based on the calculated error and the predetermined angular difference.

* * * * *